April 1, 1947.  R. F. O'TOOLE ET AL  2,418,275

APPARATUS FOR ROASTING COFFEE

Filed Aug. 3, 1940  6 Sheets-Sheet 1

INVENTOR
Richard F. O'Toole
Alexander C. Parlini
BY
ATTORNEY

April 1, 1947.   R. F. O'TOOLE ET AL   2,418,275
APPARATUS FOR ROASTING COFFEE
Filed Aug. 3, 1940   6 Sheets-Sheet 2

INVENTOR
Richard F. O'Toole
Alexander C. Parlini
BY
ATTORNEY

April 1, 1947.    R. F. O'TOOLE ET AL    2,418,275
APPARATUS FOR ROASTING COFFEE
Filed Aug. 3, 1940    6 Sheets-Sheet 3

INVENTORS
Richard F. O'Toole
Alexander C. Parlini
BY
ATTORNEY

April 1, 1947.                R. F. O'TOOLE ET AL                2,418,275
                         APPARATUS FOR ROASTING COFFEE
                 Filed Aug. 3, 1940              6 Sheets-Sheet 4

INVENTOR
Richard F. O'Toole
Alexander C. Parlini
BY
ATTORNEY

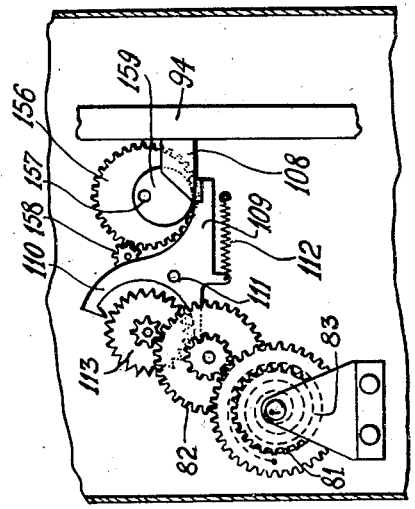
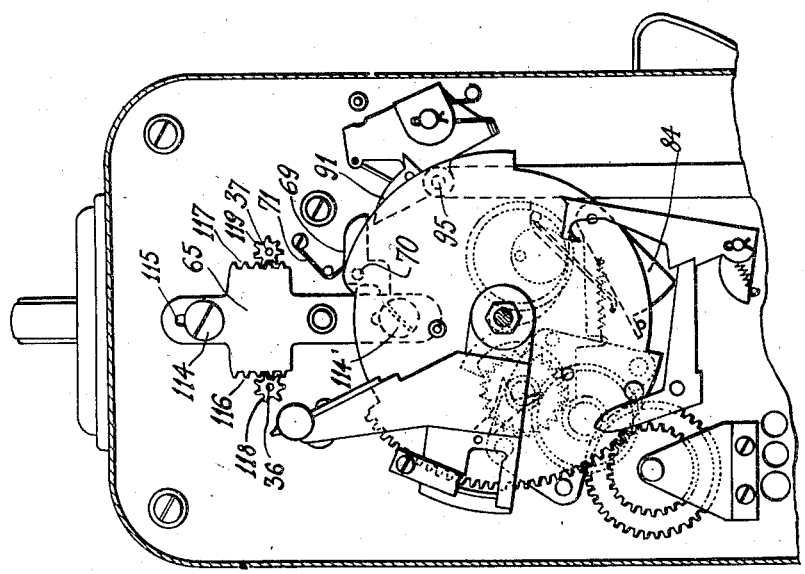

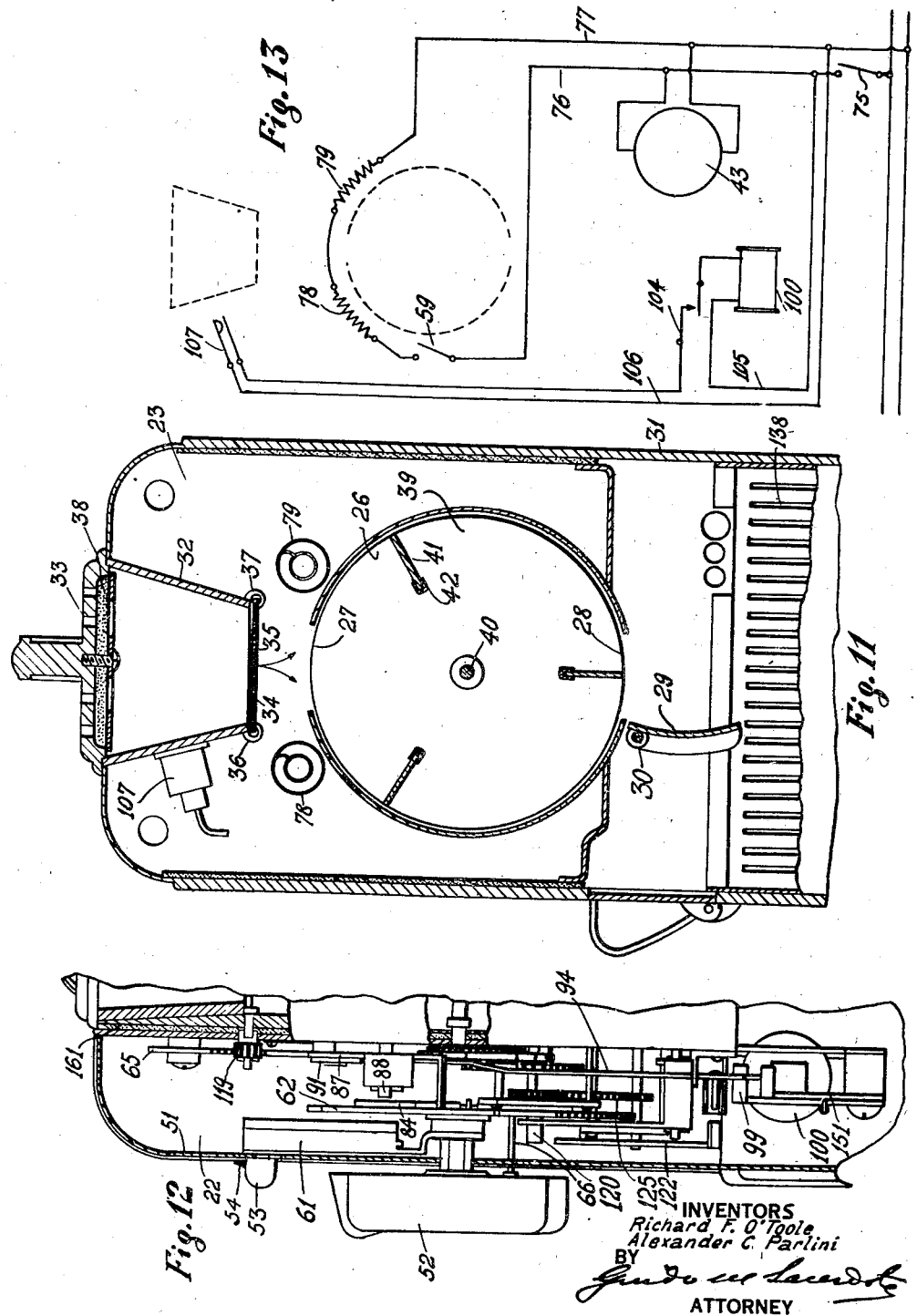

Patented Apr. 1, 1947

2,418,275

UNITED STATES PATENT OFFICE 2,418,275

APPARATUS FOR ROASTING COFFEE

Richard F. O'Toole, Scarsdale, and Alexander C. Parlini, Freeport, N. Y., assignors of one-half to said O'Toole, and one-fourth to Nicholas J. Vezeris, and one-fourth to Spiro Linakis, both of New York, N. Y.

Application August 3, 1940, Serial No. 350,460

21 Claims. (Cl. 34—45)

This invention relates to the art of roasting coffee, and more particularly refers to improvements in methods of and devices for automatically roasting coffee to any desired degree, and for subsequently cooling the coffee in a manner calculated to preserve its aroma and flavor.

The roasting of coffee is a delicate operation, inasmuch as during the heating period the coffee exudes some volatile aromatic oils, which should be prevented from escaping together with the moisture in the form of steam. Furthermore, it is extremely difficult to control the heat so that the coffee will be roasted exactly to the point desired. The color is not a sufficiently reliable indication of the degree of roasting, because different coffees may assume different colors for the same degree of roasting, and if color is used as a standard it may well be that the coffee may either be roasted too little or too much.

Exposure of the coffee to a given temperature for a given period of time also is not a reliable method of producing a given degree of roasting, because different coffees require different exposures to heat in order to reach the same degree of roasting; in fact, we have found that more than the time, the temperature to which the coffee is subjected is the important factor in controlling the degree of roasting, the time being important only in that it should be of sufficient duration to insure an even roasting of the coffee beans all through.

We have found that in order to fully preserve the aroma of the coffee, it is desirable to subject the green beans to a conditioning period, preparatory to the roasting period proper, said conditioning period, during which the coffee is subjected for a certain time to a relatively low heat, giving a chance to the moisture contained in the beans to evaporate without carrying off the volatile oils. In addition, we have found that the treatment of the coffee immediately after the roasting period is also an important factor affecting the quality of the product which is ultimately supplied to the grinder to be pulverized or ground.

The primary object of our invention is to provide a novel and improved apparatus for roasting coffee, having means for automatically controlling the degree of roasting to a predetermined standard, principally by regulating the temperature reached in the roasting oven during the roasting operation.

A further object is to provide an automatic apparatus for roasting coffee to any desired degree, whereby the coffee beans will be subjected to the action of heat for a given period of time, which is the same in all cases, irrespective of the degree of roasting to be produced, while the degree of roasting will be determined by means regulating the temperature conditions in the roasting oven.

Another object is to provide a coffee roaster of a novel and improved design, having means for subjecting the coffee beans to a conditioning period previous to subjecting them to the roasting operation, and having means for controlling the conditions under which the roasting operation is carried out, insuring an even roast to a predetermined standard, and the preservation of the full aroma and flavor of the coffee.

A further object is to provide, in apparatus of the character specified, novel and improved means for cooling the coffee beans subsequent to the roasting operation, in a manner insuring the reabsorption and retention by said beans, of the aromatic oils which are chiefly responsible for the aroma and flavor of the brew.

A still further object of our invention is to provide an apparatus for roasting coffee which, once set for a predetermined result, will be entirely automatic in causing the coffee to go through a succession of steps leading to the production of the roasted and cooled beans ready for the grinding operation, the grinding device used for the latter operation preferably also being incorporated in the apparatus itself.

Other objects and advantages of the present invention will more fully appear as the description proceeds, and will be set forth and claimed in the appended claims.

Our invention is illustrated by way of example in the accompanying drawings, in which:

Fig. 9 is a view similar to Fig. 7, showing in dotted lines parts concealed by the cam element;

Fig. 10 is a detail view showing in front elevation the escapement mechanism controlling the return movement of the cam;

Fig. 11 is a fragmentary vertical section through line 11—11 of Fig. 2;

Fig. 12 is a fragmentary vertical section through line 12—12 of Fig. 6; and

Fig. 13 is a wiring diagram of the electrical operating circuit.

Figure 2:
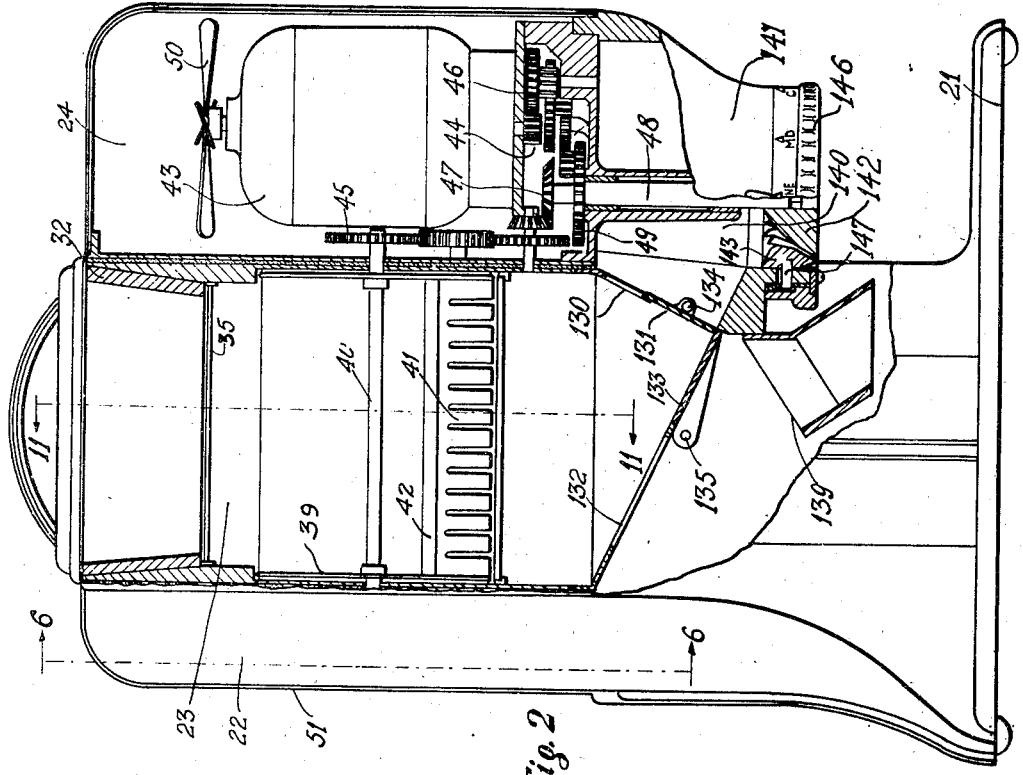
Fig. 2 is a side view in elevation thereof, partly broken away and sectioned.

The device illustrated comprises a frame consisting of a body portion 20, supported by a base 21. The body portion of the frame is divided into a front chamber 22, an intermediate chamber 23, and a rear chamber 24. In the front chamber 22 is housed the controlling mechanism, shown in detail in Figs. 6 to 10 and 12. The intermediate chamber 23 houses the charging, roasting and cooling chambers, and the rear chamber 24 houses the electric motor actuating the agitator within the roasting chamber and the grinding mechanism also actuated by said motor. The base portion of the device is open at the rear, as shown at 25, to allow the insertion of a suitable receptacle under the grinding device and discharge outlet with which the device is provided.

Referring more particularly to Fig. 11, it will be seen that chamber 23, within which the heat treatment of the coffee takes place, houses the roasting oven 26, which is in the form of a stationary cylindrical shell having an opening 27 at the top and another opening 28 at the bottom, said opening 28 being controlled by a normally open door 29 carried by a shaft 30, said door being shown in Fig. 11 in its normal position.

When said door is released from its closed position in a manner which will be later described, the weight of the coffee in the oven will force said door open and the coffee will be discharged into the cooling chamber 31.

At the top the device is provided with a charging hopper 32, extending within chamber 23, said hopper being provided with a removable cover 33 and a bottom trap door consisting of two halves 34, 35, carried by shafts 36, 37, respectively, running in a front to rear direction.

Said trapdoor is normally held in a closed position, as shown in Fig. 11, in a manner which will be later described, and the cover 33 is preferably provided with a pad 38 of felt or other porous material, allowing the escape of steam from the hopper. The two parts 34, 35 of the trapdoor are preferably perforated to allow some heat to reach the inside of the hopper in order to dry the green coffee beans therein contained before they are discharged in the roasting oven through opening 27.

While the coffee beans are being roasted within the roasting oven they are continuously agitated by being alternately raised along the wall of the oven and allowed to drop back by the action of a spider shaped agitator, consisting of two end disks 39, mounted upon a shaft 40 coaxial with the roasting oven, and a number of circumferentially spaced radially directed comb shaped blades 41, extending between the two disks, said blades being preferably flexible and having their outer edge abutting against the inner surface of the oven and their inner edge mounted in channeled bars, such as 42, extending between the two disks.

As will be understood, the rotatory movement of the agitator will cause its blades to engage and push the coffee beans along the bottom and side of the oven until they are brought to an angle where they will fall back by gravity to the bottom of the oven. During this process the coffee beans closest to the center of the oven will be brought to a position where they will fall first to the bottom of the oven so that at the next stroke they will be right against the wall of the oven, so that while the agitator continues to revolve all the beans will successively come to occupy different positions within the oven and will thus be exposed to heat in a uniform manner.

The agitator is driven by an electric motor 43 housed within chamber 24, through pinion 44 mounted on the shaft of said motor, a gear wheel 45 mounted on the shaft 40 of the agitator and a reduction gearing, generally designated by numeral 46, interposed therebetween. Said reduction gearing includes a conical gear wheel 47 carried by the grinder shaft 48 and a gearwheel 49 also mounted on said shaft 48, said gearwheel 49 constituting the last element of the train of gearings so far as the grinder shaft itself is concerned.

It is to be understood that the device is designed for the treatment of a predetermined quantity of coffee at each operation, the amount of heat supplied to the oven during the operation and the duration of the operation being regulated accordingly.

In its main phases the operation of the device takes place by steps in the following sequence:

Cover 33 is removed from the hopper 32 and a quantity of green coffee beans, sufficient to fill said hopper, is poured therein. At this time the trapdoor 34, 35 of the hopper is, of course, in its closed position and so is door 29 at the bottom of the oven. Cover 33 is then replaced in the hopper and the necessary switches are operated to energize the motor and the electric heating elements housed within chamber 23.

While these electric heating elements bring the temperature of chamber 23 to a predetermined value the coffee beans remain in the hopper and are preheated to a certain extent, causing them to lose their moisture, which is discharged through porous pad 38, so that the beans will eventually reach the oven in a uniformly dry condition. At the same time the oven itself is also preheated to a predetermined temperature that, in practice, we have found to be satisfactory at about 200° F.

When the proper temperature has been reached a thermostatically controlled device will release the trapdoor 34, 35 and the weight of the coffee beans within the hopper will force the two halves of the trapdoor open so that they will form a sort of funnel discharging the coffee beans into the oven through opening 27. A short time thereafter the trapdoor 34, 35 is once more closed while the coffee beans are being agitated within the oven and while the temperature continues to increase for a given period of time, at the end of which the circuit of the heating elements is automatically interrupted.

The duration of this time period can be set in advance according to the kind of roast desired. For instance, if a light roast is to be produced, the time during which the heating elements are energized will be shorter than if a so-called French roast has to be produced.

However, the termination of the period during which current is supplied to the heating elements does not determine the termination of the roasting period. The roasting operation will continue for a certain time after the circuit of the heating elements has been interrupted, the deenergization of the circuit of said heating elements after a longer or shorter period merely determining the maximum limit that the temperature in the oven is allowed to reach while the roasting operation proceeds, the duration of the roasting operation proper being always the same irrespective of the kind of roast to be produced. In other words, the temperature is allowed to reach a certain value according to the kind of roast to be produced and the duration of the roasting period in all cases is such as will insure thorough and uniform treatment and complete heat penetration for all the beans of which the charge is composed.

At the termination of the roasting period the door 29 at the bottom of the roasting oven will be automatically released and will be forced to open by the weight of the coffee beans in the oven, said beans falling into the cooling chamber where they are exposed to a current of cool air impelled through the walls of the cooling chamber by a fan 50 mounted on a shaft of the motor 43.

The cooling operation will cause the coffee beans to reabsorb the aromatic oils exuded from their surface during the roasting operation, while their pores are open, thus preserving the full flavor and quality of the coffee.

From the cooling chamber the coffee beans can be discharged into a receptacle for later use or they can be discharged directly into the grinder for grinding and immediate use.

While, after the coffee beans have been discharged from the roasting oven, a new charge can be made ready in the hopper, means are provided for preventing the device from functioning until the time when the temperature in the oven has decreased to a point where the thermostatically controlled device governing the discharge of the coffee beans into the roasting oven are no longer responsive to such temperature. This is done in order to prevent the possibility of the roasting operation being started at a temperature higher than the normal starting operation, because this would mean that the maximum temperature at the time when the heating elements are deenergized will also be correspondingly higher than that required by the type of roast for which the device has been set, and in extreme cases might even be excessive to the point of totally ruining the coffee to be treated.

We will now proceed to describe in detail the various elements and mechanisms controlling the operation of the device.

The controlling devices, with the exception of the starting handle and the knob of the setting lever, which are located externally of the front wall 51 of chamber 22, are located within said chamber.

Figure 1:
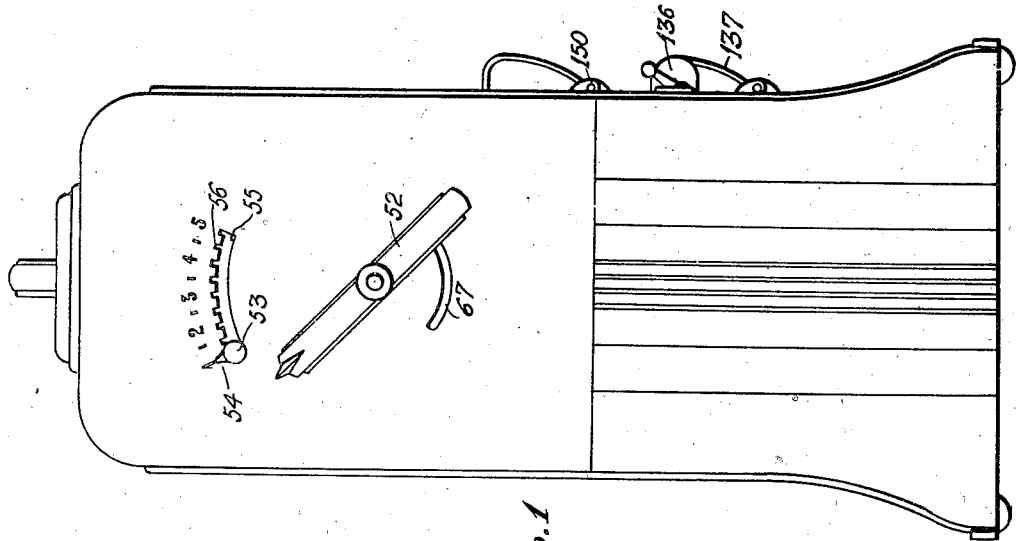
Fig. 1 is a front view in elevation of a coffee roaster and grinder embodying our invention.

Fig. 1 shows the starting handle or actuator 52 in its normal position of rest, ready to be set to its other extreme position symmetrical thereto with respect to the central vertical plane passing through the axis of rotation of said actuator, by turning said actuator in a clockwise direction about 90° from the position shown. Said Fig. 1 also shows the knob 53 having an indicating hand 54 by means of which the device can be set for different degrees of roasting according to the position at which said hand 54 is set with respect to a segmental slot 55 having circumferentially spaced indentations 56 adapted to be engaged by said knob 53.

The starting handle or actuator is rotatably mounted on a stud 57 which is fixed to the front wall 51, said stud 57 being shown coaxial with shaft 40 of the agitator. On said stud is also swingably mounted an arm 58, carrying a switch 59 (see Fig. 6), provided with a bifurcated switch arm 60. Said arm also carries an extension 61, at the end of which is resiliently mounted knob 53 which can be depressed inwardly against the action of a spring (not shown) tending to urge said knob outwardly in engagement with any one of the indentations 56 of slot 55.

Figure 6:
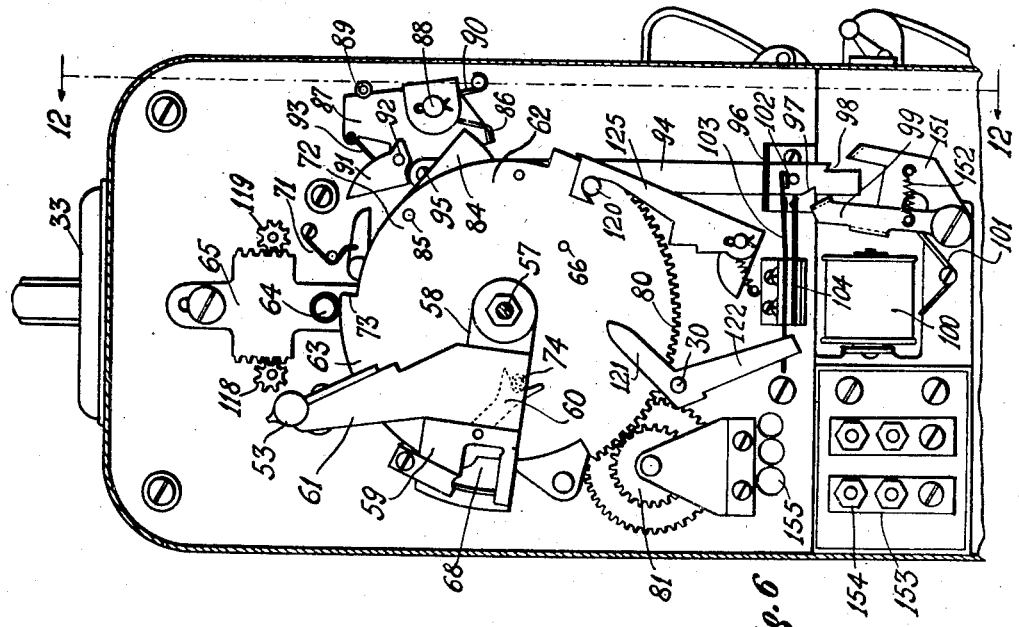
Fig. 6 is a fragmentary vertical section through line 6—6 of Fig. 2.

On said stud 57 is also rotatably mounted a cam-shaped disk 62, having a segmental portion 63 that, in the position of rest of said cam shown in Fig. 6, extends in a counterclockwise direction from a pin 64 frontwardly extending from a rack 65, said pin 64 resting upon the right end of said segmental portion 63. In this position, therefore, the rack 65 is restricted against descending movement from its normal position shown, by said cam.

The cam disk 62 is connected to the actuator by means of a pin 66 (see Fig. 12) passing through a segmental slot 67 provided in the front wall 51, so that a turning movement of the actuator will be shared by the cam.

Figure 7:
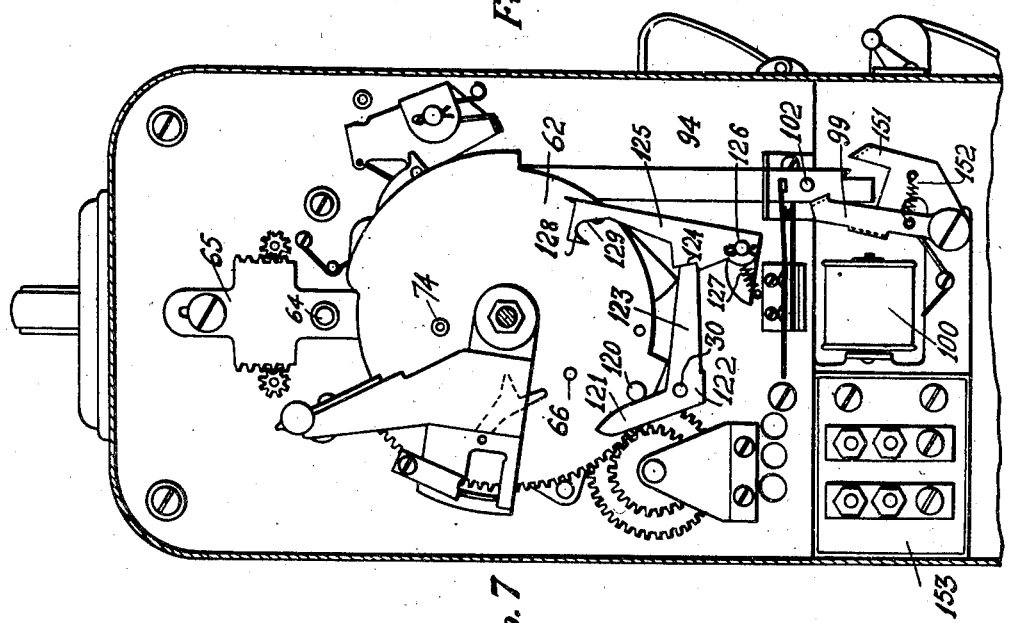
Fig. 7 is a view similar to Fig. 6, showing the mechanism set for operation.

The segmental portion 63 of the cam extends in a counterclockwise direction an angle somewhat less than 90°, so that when the handle is turned 90° in a clockwise direction to its other extreme position, a depressed portion 68 in the cam will remain directly under pin 64, as shown in Fig. 7, and will no longer impede the descending movement of the rack.

However, the rack will not descend from the position shown because in said position it is engaged by a pawl 69, pivotally mounted at 70 (see Fig. 9) and urged in its engaging position by a spring 71.

The segmental portion 72 of the cam immediately at the right of segmental portion 63 is of a smaller radius than said portion and is connected therewith by a radially directed shoulder portion 73. The cam is provided with a frontwardly extending pin 74 which will engage one or the other of the arms of the bifurcated end of the switch arm 60 when the cam moves in one or the other direction, and said pin will, therefore, serve to throw the switch to the on or off position, as the case may be.

The switch is normally in the off position and, as stated, before the operation of the device is started said switch is set at a predetermined angular position by setting knob 53 at any one of the positions shown along slot 55.

After the switch 59 has been thus set, the main switch, shown at 75 in the diagram of Fig. 13, is closed, thus energizing the main circuit 76, 77, in which is inserted motor 43. The actuator is then moved in a clockwise direction to its other extreme position, the extent of its movement being determined by the angular extension of slot 67. During said movment pin 74 of the cam will engage the bifurcated arm of switch arm 60 and the switch 59 will close the circuit of the heating elements shown at 78, 79 in Figs. 11 and 13 within chamber 23.

A segmental portion 80 of the cam is in the form of a toothed segment engaging a toothed wheel 81, forming part of an escapement mechanism, generally designated by numeral 82 in Fig. 10.

Said escapement mechanism is normally held under a certain tension by a spiral spring 83 and will be set under a higher tension by the clockwise movement of the cam. The cam is provided with a dog 84, pivotally mounted at 85, said dog constituting a yielding projection from the periphery of portion 72 of the cam, adapted to engage ledge 86 of a bracket 87 when the cam is moved to the position shown in Figs. 7, 8 and 9. The bracket 87 is pivotally mounted at 88 and is normally held in the position shown, where its rear edge abuts against stop pin 89, by the action of a spring 90. Said bracket also carries a dog 91, pivotally mounted at 92, said dog being normally held in the position shown in Fig. 6 by a spring 93 and being adapted to move in a clockwise direction against the action of said spring but being restrained from moving in the opposite direction due to the fact that said dog abuts against the upper end of a link 94, pivotally suspended at 95, from bracket 87.

Said link extends downwardly from pivot 95, passing through a guide 96, and its lower end is formed at the left side with a notch 97 and at the right side with another notch 98. Notch 97 is adapted to be engaged by the arm 99 constituting the armature of an electromagnet 100 when said link 94 is moved downwardly from its normal position shown in Fig. 6 to the position shown in Fig. 7 by the action of bracket 87, which is caused to turn in a counterclockwise direction when engaged by dog 84 during the early part of the clockwise movement of the cam, when link 94 is thus engaged by armature 99, which is urged in its engaging position by the action of spring 101.

During the counterclockwise movement of bracket 87 dog 91 will eventually strike against pawl 69 but since said dog 91 can yield against the action of spring 93 it will eventually pass beyond said pawl to the position shown in Fig. 9 without affecting the status of said pawl.

When link 94 occupies its normal upward position shown in Fig. 6, a pin 102, carried by the lower end of said link, holds in the off position a spring terminal 103 forming part of a switch 104, inserted in the circuit of electromagnet 100. As soon as link 94 starts to descend spring terminal 103 will move to the on position to close the circuit 105, 106, of electromagnet 100. However, said circuit is normally interrupted by a thermostatic device 107, located in chamber 23, said thermostatic device becoming operative to close the circuit only when the temperature within chamber 23 reaches a predetermined point.

When link 94 is thus moved to and locked in the position shown in Fig. 7, a lug 108, carried by said link, will press against arm 109 of an escapement anchor 110, pivotally mounted at 111, against the action of a spring 112, holding one of the teeth of said escapement anchor in permanent engagement with the teeth of star wheel 113 of the escapement mechanism (see Fig. 10). Said escapement mechanism will, therefore, be prevented from operating to return the cam to its original position until such time when the return upward movement of the link 94 will cause lug 108 to release the escapement anchor.

It is to be understood that toothed wheel 81 will operate the other elements of the escapement mechanism through the action of a unidirectionally operative clutch (not shown). Said clutch makes it possible for said wheel 81 to rotate independently of the other elements of the escapement mechanism when the cam is moved in a clockwise direction to its operative position.

The upward return movement of link 94 to its normal position will take place only when said link has been released by armature 99, that is, when the temperature within chamber 23 having reached the point at which the thermostatic device will become operative, the circuit of the electromagnet will become energized and the armature 99 will be attracted by the electromagnet. At such time, link 94 will be automatically returned to its normal position by bracket 87, urged in its return movement by the action of spring 90. As soon as link 94 has reached its normal position the circuit of the electromagnet will once more be interrupted by pin 102 pressing against spring terminal 103.

The return movement of link 94 will cause two other operations to take place; namely, by the action of dog 91 pressing against the arm of pawl 69 it will cause said pawl to turn in a counterclockwise direction, releasing rack 65, and by the action of lug 108 releasing anchor member 110 it will enable the escapement mechanism 82 to operate to return the cam 62 to its original position by a slow movement, the duration of which will be regulated by the speed of the intermittent motion of the star wheel, in a well known manner. The duration of the return movement of the cam substantially corresponds to the duration of the roasting period which starts as soon as rack 65 is released from pawl 69, and stops as the cam is about to reach the end of its return movement.

Figure 8:
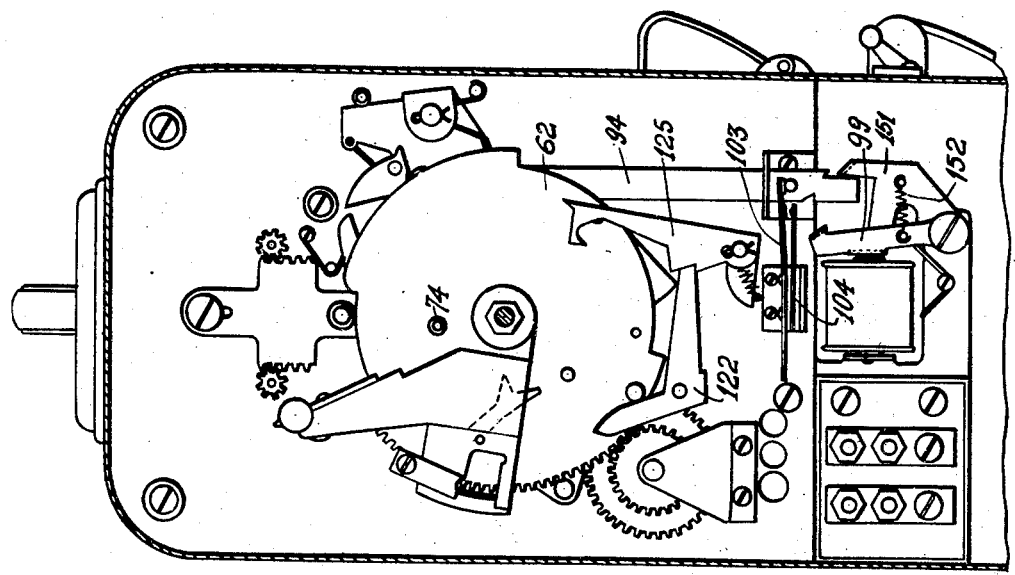
Fig. 8 is a similar view, showing the mechanism at the time when the coffee beans are being discharged into the roasting chamber.

As previously stated, rack 65 is mounted so as to be free to descend from its normal position shown in Fig. 6 to the position shown in Fig. 8 when released by pawl 69. The vertical movement of said rack is limited by the stem of a screw 114 projecting through vertical slot 115 provided in the rack. The rack is formed with two toothed lateral edges 116, 117, meshing with pinions 118, 119, respectively, said pinions being mounted on shafts 36, 37 which, as stated, carry the two halves 34, 35 of the trapdoor.

The upward position of the rack shown in Figs. 6, 7 and 9 corresponds to the closed position of the trapdoor shown in Fig. 11. As stated, said trapdoor will open by gravity, but will be returned to its closed position shortly after cam 62 has started its return movement, when pin 64 will be forced upwardly by segmental portion 63 of the cam and the rack will cause pinions 118, 119 to turn in the trapdoor closing direction.

From the foregoing it will, therefore, be seen that when the cam is set to the position shown in Fig. 7, the electric heating elements are energized, the link 94 is moved to its lowermost position, and is held in said position, preventing return movement of the cam, until such time as the temperature within chamber 23, and consequently within the oven, reaches the point at which the circuit of the electromagnet will be energized by the thermostatic device and link 94 will be released for its return movement. It will also be seen that as soon as the return movement of link 94 takes place cam 62 will start on its return movement and rack 65 will be released from pawl 69 so that the coffee beans contained in hopper 32 will fall into the roasting oven through opening 27.

At this time, door 29 will occupy its closing position, having been set in said position by cam 62 when said cam has reached the end of its movement to the position shown in Fig. 7. The movement of door 29 to its closing position is effected by the pin 120 carried by cam 62, said pin bearing against arm 121 of a crank lever 122, fixed on shaft 30, and causing said crank lever to rotate said shaft 30 to the closed door position.

When such closed door position has been reached the tip end of the other arm 123 of crank lever 122, will be engaged and locked in position by a notch 124 provided in a lever 125, pivotally mounted at 126, and normally urged in its engaging position by a spring 127.

Said lever 125 has a hook shaped outer end 128, adapted to engage pin 120 at the end of the return movement of the cam, thus limiting said return movement. Immediately before the cam reaches the end of its return movement, pin 120 will bear against a lug or projection 129 provided in lever 125 and will force said lever outwardly so as to cause its notch 124 to release arm 123 of the crank lever. When this happens the weight of the coffee beans in the roasting oven will force door 29 open and the beans will fall into cooling chamber 31, as previously explained.

At a certain time during the return movement of the cam, dependent upon the position at which switch 59 has been set by knob 53 along slit 55, pin 74 of the cam will engage the bifurcated end of switch arm 60 and will throw the switch to its off position. At this time, the heating elements will be deenergized but the roasting operation will continue up to the end of the return movement of the cam, when the roasted coffee beans will be caused to fall into the cooling chamber, as explained.

The cooling chamber has a rear wall 130, provided with a normally closed door 131 and a rearwardly inclined bottom wall 132 provided with a normally closed door 133, said doors being located at the lowermost end of the walls respectively served thereby. Door 131 is carried by a shaft 134 and door 133 is carried by a shaft 135, said shafts being manually operable by means of knob 136 and handle 137, respectively (see Fig. 1).

Rear wall 130 and bottom wall 132 of the cooling chamber are perforated by narrow slots, such as shown at 138 in Fig. 11, said slots preventing the coffee beans from falling from the cooling chamber, while at the same time allowing air impelled by fan 50 to enter the cooling chamber through the slots in wall 130 and gradually cool the roasted coffee beans, said air being discharged through the slots in bottom wall 132. After cooling, the beans can either be discharged from the cooling chamber by tilting door 133 to its open position where the beans are caused to fall into a funnel 139 and thence into a receptable which may be placed under the funnel, or else, the coffee beans can be discharged by opening door 131, in which case they will fall by gravity into the receiving chamber 140 of the grinding device mounted at the lower end of chamber 24, said grinding device being generally designated by numeral 141.

Figure 3:
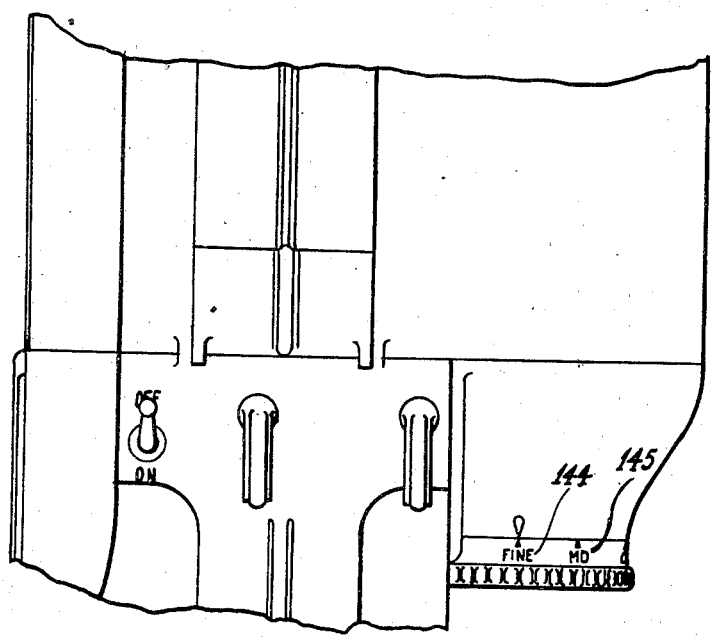
Fig. 3 is a fragmentary side view in elevation thereof.
Figure 4:
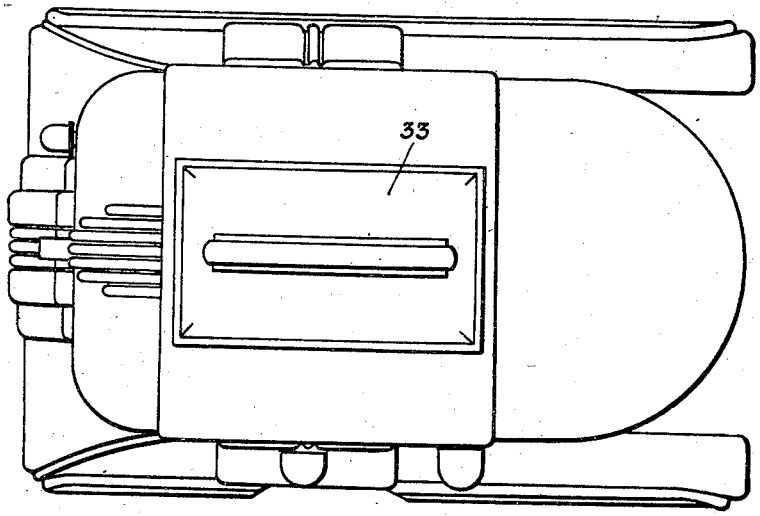
Fig. 4 is a plan view thereof.

The grinding device proper consists of a male grinding disk 142, carried by the lower end of shaft 48, and a female grinding ring 143 surrounding said male grinding disk. The female grinding ring is mounted so as to be adjustable vertically with respect to the male grinding disk, in order to regulate the degree of fineness to which the coffee beans will be ground. The female grinding ring can be moved to three or four different positions, which may be determined by the setting of suitable indications 144, 145, carried by an adjusting ring 146 (see Figs. 2 and 3), rotatably mounted at the lower end of chamber 140. Said ring 146 carries a pin 147 which engages a peripheral groove in female grinding ring 143, as shown in Fig. 2, said groove comprising several horizontally extending axially spaced segmental sections connected in sequence to one another, as will be understood.

Figure 5:
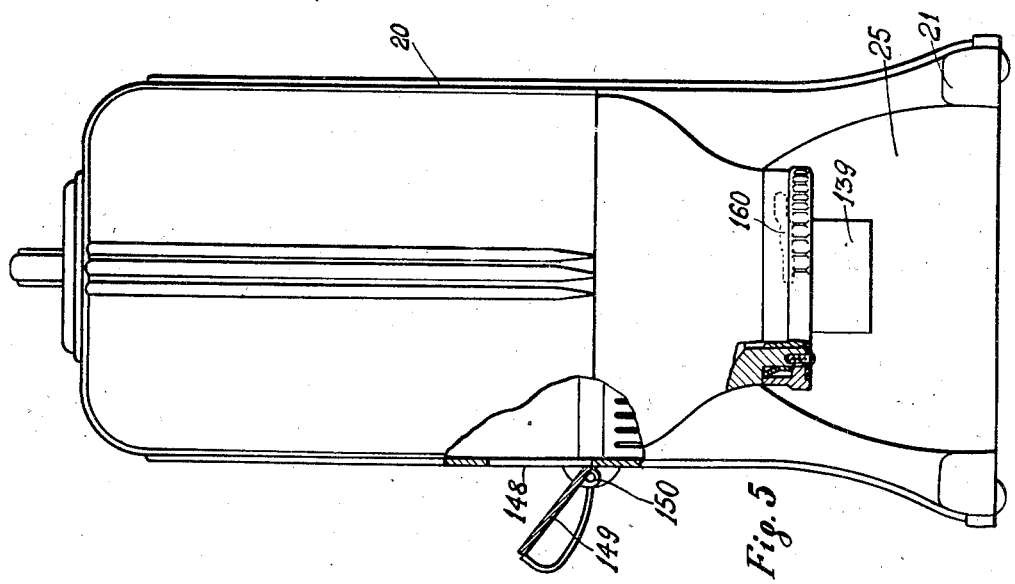
Fig. 5 is a rear view in elevation of the same, with parts broken away and sectioned.

Chamber 140 is also provided at one side with an opening 148 controlled by a normally closed door 149, pivotally mounted at 150 (see Figs. 1 and 5). Said opening 148 is provided for the purpose of pouring the roasted beans into chamber 140, preparatory to grinding them, when said beans have been removed from the device through door 133 in the bottom of the cooling chamber.

As previously stated, after the device has been used in roasting one batch of coffee, the heat chamber 23 should be allowed to cool below the temperature to which the thermostatic device is responsive, in order to prevent overheating or burning the next batch.

As we have explained, when the heating elements are deenergized by switch 59 being thrown to the off position, the temperature within chamber 23 continues to remain higher than that causing the thermostatic device 107 to become operative, so that although the circuit of electromagnet 100 will have been interrupted at switch 104, it will not be interrupted by the thermostatic device, and will not be interrupted by said device as long as the temperature in chamber 23 remains above the set limit. Consequently, if while this condition persists an attempt is made to turn the actuator and with it cam 62 to the position shown in Fig. 7, as soon as the movement is started dog 84 bearing against ledge 86 of bracket 87 will cause link 94 to move downwardly, instantly releasing spring terminal 103 of switch 104, thus causing said switch 104 to complete the circuit of electromagnet 100.

The electromagnet will in its turn instantly attract its armature 99 and with it a pawl 151, connected to said armature by a spring 152. Said pawl will thus be moved directly in the path of the shoulder formed by notch 98 in link 94 and will positively prevent further downward movement of said link, thus effectively locking the entire mechanism against operation until the circuit of the electromagnet will be interrupted by the thermostatic device.

The heat chamber 23 is preferably insulated by means of an insulating lining applied against its walls, in order to prevent heat radiation and thus insure a good operating efficiency.

For the sake of clarity, the electrical connections between the various elements inserted in the operating circuit have not been shown in the drawings, but their arrangement will be clearly understood from the wiring diagram of Fig. 13. In the drawings 153 designates the panel carrying the binding posts 154, and 155 designates a set of openings through the wall separating chamber 22 from chamber 23 for the passage of the wires to the thermostatic device and heating elements within chamber 23 and back from the thermostatic device to the electromagnet 100 in chamber 22.

It is obvious that the constructional details of our invention may vary from those shown without departing from the inventive idea. The drawings should, therefore, be understood as being intended for illustrative purposes only and not in a limiting sense.

We, accordingly, reserve the right to carry our invention into practice in all those ways and manners which may enter fairly into the scope of the appended claims.

We claim:

1. In apparatus of the character described the combination, with a roasting chamber, of means for supplying heat to said chamber, means for admitting a charge of coffee beans to said chamber, means for locking said charge admitting means against discharge, means for releasing said locking means when a given temperature has been reached within said chamber, means for automatically deenergizing said heat supplying means after a predetermined time period from the time of release of said locking means, when the roasting operation is still incomplete, to prevent the temperature in said chamber from rising beyond a predetermined value, and means for thereafter automatically discharging said beans from said chamber at the end of an additional predetermined time period.

2. In apparatus of the character described the combination, with a roasting chamber, of means for supplying heat to said chamber, means for admitting a charge of coffee beans to said chamber, means for locking said charge admitting means against discharge, means for releasing said locking means when a given temperature has been reached within said chamber, adjustable means adapted to set at different control positions for thereafter automatically deenergizing said heat supplying means after a predetermined time period from the time of release of said locking means, when the roasting operation is still incomplete, to prevent the temperature in said chamber from rising beyond a value dependent upon the setting of said adjustable means, and means thereafter for automatically discharging said beans from said chamber at the end of an additional predetermined time period.

3. In apparatus of the character described the combination, with a roasting chamber, of a charging chamber therefor, means for supplying heat to said chambers, means for discharging coffee beans contained in said charging chamber into said roasting chamber, means for locking said discharging means against discharge, means for automatically releasing said locking means when a given temperature has been reached within said roasting chamber, means for automatically deenergizing said heat supplying means after a predetermined time period from the time of release of said locking means, when the roasting operation is still incomplete, to prevent the temperature in said roasting chamber from rising beyond a predetermined value, a cooling chamber, and means for automatically discharging said beans from said roasting chamber into said cooling chamber, at the end of an additional predetermined time period.

4. Apparatus of the character described comprising a casing, a roasting chamber and a charging chamber therefor enclosed within said casing, electric heating means within said casing, thermostatically controlled means for discharging coffee beans contained in said charging chamber into said roasting chamber, means for locking said discharging means against discharge, means for automatically releasing said locking means when a given temperature has been reached within said casing, means for automatically deenergizing said heating means after a predetermined time period from the time of release of said locking means, when the roasting operation is still incomplete, to prevent the temperature in said roasting chamber from rising beyond a predetermined value, a cooling chamber, and means for thereafter automatically discharging said beans from said roasting chamber into said cooling chamber, at the end of an additional predetermined time period.

5. Apparatus of the character described comprising a casing, a roasting chamber and a charging chamber therefor enclosed within said casing, electric heating means within said casing, thermostatically controlled means for discharging coffee beans contained in said charging chamber into said roasting chamber, when a given temperature has been reached within said casing, means for thereafter deenergizing said heating means to prevent the temperature in said roasting chamber from rising beyond a predetermined value, a cooling chamber, means for automatically discharging said beans from said roasting chamber into said cooling chamber, at the end of a predetermined time period subsequent to the operation of said thermostatically controlled means, and a timing device controlling the operation of said deenergizing means and roasting chamber discharging means.

6. Apparatus of character described comprising a stationary roasting chamber, means for supplying heat to said chamber, an agitator within said chamber, means automatically rendering said heat supplying means inoperative at the end of a predetermined time period from the time a charge has been admitted to said chamber, when the roasting operation is still incomplete, to prevent the temperature within said chamber from rising beyond a predetermined value, and means for thereafter automatically discharging the contents of said chamber at the end of an additional predetermined time period.

7. Apparatus of the character described, comprising a stationary roasting chamber, a charging chamber therefor, an agitator within said roasting chamber, means for supplying heat to said chambers, means for discharging coffee beans contained in said charging chamber into said roasting chamber, means for locking said discharging means against discharge, means for automatically releasing said locking means when a given temperature has been reached within said roasting chamber, means for thereafter deenergizing said heat supplying means after a predetermined time period from the time of release of said locking means, when the roasting operation is still incomplete, to prevent the temperature in said roasting chamber from rising beyond a predetermined value, a cooling chamber, and means for automatically discharging said beans from said roasting chamber into said cooling chamber, at the end of an additional predetermined time period.

8. Apparatus of the character described, comprising a stationary roasting chamber, a charging chamber therefor, an agitator within said roasting chamber, means for supplying heat to said chambers, means for automatically discharging coffee beans contained in said charging chamber into said roasting chamber, means for locking said discharging means against discharge, means for automatically releasing said locking means when a given temperature has been reached within said roasting chamber, means for thereafter deenergizing said heat supplying means after a predetermined time period from the time of release of said locking means, when the roasting operation is still incomplete, to prevent the temperature in said roasting chamber from rising beyond a predetermined value, a cooling chamber, means for automatically discharging said beans from said roasting chamber into said cooling chamber, at the end of an additional predetermined time period, and means for supplying a current of cooling air to said cooling chamber.

9. Apparatus of the character described comprising a roasting chamber having a discharge outlet, a charging chamber therefor, a normally closed trapdoor for said charging chamber, electric heating means for supplying heat to said chambers, a switch controlling said heating means, a door controlling said discharge outlet, a cooling chamber underneath said roasting chamber, an actuator controlling the operation of said switch and doors, rendering said switch operative to energize said heating means when said actuator is moved from an inoperative to an operative position and rendering said switch inoperative during its return movement, means normally locking said trapdoor in its closed position, means locking said actuator against return movement when said actuator reaches its operative position, means locking said discharge outlet controlling door in its closed position when said actuator reaches its operative position, means for releasing said trapdoor locking means and said actuator locking means, an electromagnet controlling the operation of said releasing means, a thermostatic device controlling the circuit of said electromagnet, means controlled by said actuator, releasing said discharge outlet controlling door, at the end of the return movement of said actuator, and means returning said actuator to its inoperative position at a predetermined rate of speed.

10. In apparatus of the character described, a roasting chamber, electric heating means supplying heat to said chamber, an actuator movable from a normal inoperative position to an operative position, means to return said actuator to its inoperative position at a predetermined rate of speed, a switch controlling said heating means, adapted to be set in its operative position by said actuator to energize said heating means when said actuator is moved to its operative position, and to be reset in its inoperative position by said actuator when said actuator is returning to its inoperative position, means locking said actuator in its operative position, and thermostatically controlled means releasing said locking means when the temperature in said chamber reaches a predetermined value.

11. In apparatus of the character described, a roasting chamber, electric heating means supplying heat to said chamber, an actuator movable from a normal inoperative position to an operative position, means to return said actuator to its inoperative position at a predetermined rate of speed, a switch controlling said heating means, adapted to be set in its operative position by said actuator to energize said heating means when said actuator is moved to its operative position, and to be reset in its inoperative position by said actuator when said actuator is returning to its inoperative position, means locking said actuator in its operative position, thermostatically controlled means releasing said locking means when the temperature in said chamber reaches a predetermined value, and means for setting said switch at different positions along the path of movement of said actuator.

12. Apparatus of the character described comprising a roasting chamber having a discharge outlet, a charging chamber therefor, a normally closed trapdoor for said charging chamber, electric heating means for supplying heat to said chambers, a switch controlling said heating means, a door controlling said discharge outlet, a cooling chamber underneath said roasting chamber, an actuator controlling the operation of said switch and doors, rendering said switch operative to energize said heating means when said actuator is moved from an inoperative to an operative position and rendering said switch inoperative during its return movement, means normally locking said trapdoor in its closed position, means locking said actuator against return movement when said actuator reaches its operative position, means locking said discharge outlet controlling door in its closed position when said actuator reaches its operative position, means for releasing said trapdoor locking means and said actuator locking means, an electromagnet controlling the operation of said releasing means, a thermostatic device controlling the circuit of said electromagnet, means controlled by said actuator, releasing said discharge outlet controlling door, at the end of the return movement of said actuator, means returning said actuator to its inoperative position at a predetermined rate of speed, and means for setting said switch at different positions along the path of movement of said actuator.

13. In apparatus of the character described the combination, with a roasting chamber and a charging chamber therefor, of a door controlling the discharge of coffee beans from the latter into the former, electric heating means adapted to supply heat to said roasting chamber, a circuit for said heating means, an actuator movable from a normally inoperative to an operative position, controlling said circuit, means normally locking said door in its closed position, means locking said actuator against return movement, when said actuator is moved to and reaches its operative position, a secondary circuit, a thermostatic device responsive to a predetermined temperature due to the heat generated by said heating means, inserted in said secondary circuit, and an electromagnet also inserted in said secondary circuit, said electromagnet being adapted, when energized, to release said door and actuator locking means.

14. In apparatus of the character described, a roasting chamber having a discharge outlet, means for discharging coffee beans into said chamber, means for supplying heat to said chamber, a door controlling said outlet, an actuator movable from a normally inoperative to an operative position, controlling said discharging and heat supplying means and said door, an escapement mechanism operatively associated with said actuator, urging said actuator in its return movement to its inoperative position, means locking said escapement mechanism against operation when said actuator is in position to start its return movement, and thermostatically controlled electromagnetic means to release said locking means when the temperature in said chamber reaches a predetermined value.

15. In apparatus of the character described the combination, with a roasting chamber, means to supply heat to said chamber, and an actuator controlling the operation of said heat supplying means, of thermostatically controlled means preventing operation of said actuator when the temperature in said chamber is above a predetermined value, while said actuator is in its inoperative position.

16. In apparatus of the character described the combination, with a roasting chamber, means to supply heat to said chamber, and an actuator controlling the operation of said heat supplying means, said actuator being movable from a normally inoperative to an operative position, of a thermostatic device responsive to heat supplied by said heat supplying means, a circuit therefor, an electromagnet in said circuit, a member controlled by said electromagnet, adapted to lock said actuator against movement towards its operative position when said electromagnet is energized, a normally open switch in said circuit, and means closing said switch when said actuator is moved from its inoperative position towards its operative position, thereby causing the energization of said electromagnet if said thermostatic device is in its circuit closing position.

17. In apparatus of the character described, a roasting chamber, electric heating means to supply heat to said chamber, a circuit therefor, an actuator movable from a normally inoperative to an operative position, a switch controlling said circuit having its actuating lever in the path of said actuator, whereby said switch will be set in the on position by said actuator when said actuator is moving from its inoperative to its operative position and in the off position during the return movement of said actuator, manually operable means to move said actuator from its inoperative to its operative position, and a spring actuated timing device to effect the return movement of said actuator.

18. In apparatus of the character described, a roasting chamber, electric heating means to supply heat to said chamber, a circuit therefor, a rotatably mounted actuator movable from a normally inoperative to an operative position, an arm swingable about the axis of said actuator, a switch controlling said circuit carried by said arm, said switch having its actuating lever in the path of said actuator, whereby said switch will be set in the on position by said actuator when said actuator is moving from its inoperative to its operative position and in the off position during the return movement of said actuator, manually operable means to move said actuator from its inoperative to its operative position, a spring actuated timing device to effect the return movement of said actuator, and means for setting said arm at different angular positions with respect to said axis.

19. In apparatus of the character described, a roasting chamber having a discharge outlet, a cooling chamber under said outlet, a door controlling said outlet, means for locking said door in its closed position, means to supply heat to said chamber, a manually operable actuator movable from a normally inoperative to an operative position, controlling said heat supplying means, means for manually operating said actuator, a timing device effecting the return movement of said actuator during a predetermined period of time, and means releasing said locking means at the end of the return movement of said actuator.

20. Apparatus of the character described, comprising a roasting chamber, a charging chamber therefor having a discharge outlet leading to said roasting chamber, a trap-door controlling said outlet, means normally locking said door in its closed position, a rotatably mounted cam-shaped disk movable from a normally inoperative position to an operative position, said disk being adapted to reset said door from its open to its closed position during the return movement of said disk, electric heating means for supplying heat to said chamber, a switch controlled by said disk, energizing said heating means during the movement of said disk from its inoperative position, and deenergizing said heating means during the return movement of said disk, means locking said disk against return movement when said disk reaches its operative position, said locking means, when released, being adapted to release said door locking means, an electromagnet adapted, when energized, to release said disk locking means, a circuit for said electromagnet, and a thermostatic device, inserted in said circuit, energizing said electromagnet when the temperature in said chamber reaches a predetermined value.

21. Apparatus of the character described, comprising a roasting chamber having a discharge outlet, a cooling chamber under said outlet, a door controlling said outlet, means for locking said door in its closed position, a charging chamber having a discharge outlet leading to said roasting chamber, a trap door controlling the latter discharge outlet, means normally locking said trapdoor in its closed position, a rotatably mounted cam-shaped disk movable from a normally inoperative position to an operative position, said disk being adapted to reset said trapdoor from its open to its closed position during the return movement of said disk, electric heating means for supply heat to said chamber, a switch controlled by said disk, energizing said heating means during the movement of said disk from its inoperative position, and deenergizing said heating means during the return movement of said disk, means locking said disk against return movement when said disk reaches its operative position, the latter locking means, when released, being adapted to release said trapdoor locking means, an electromagnet adapted, when energized, to release said disk locking means, a circuit for said electromagnet, a thermostatic device, inserted in said circuit, energizing said electromagnet when the temperature in said chamber reaches a predetermined value, means effecting the return movement of said disk during a predetermined period of time, and means releasing said first mentioned locking means at the end of the return movement of said disk.

RICHARD F. O'TOOLE.
ALEXANDER C. PARLINI.

REFERENCES CITED

The following references are of record in the file of this patent:

UNITED STATES PATENTS

| Number | Name | Date |
|---|---|---|
| 1,943,211 | Dent | Jan. 9, 1934 |
| 509,298 | Cardozo | Nov. 21, 1893 |
| 1,991,564 | McLain et al. | Feb. 19, 1935 |
| 2,062,109 | Rogers | Nov. 24, 1936 |
| 2,141,586 | Woolsey et al. | Dec. 27, 1938 |
| 2,069,193 | Behr et al. | Jan. 26, 1937 |
| 1,970,499 | Dent | Aug. 14, 1934 |
| 2,010,582 | Burns et al. | Aug. 6, 1935 |
| 2,109,597 | Richeson | Mar. 1, 1938 |
| 2,188,969 | Waldvogel | Feb. 6, 1940 |
| 2,185,878 | Adams et al. | Jan. 2, 1940 |
| 1,896,230 | Farago | Feb. 7, 1933 |
| 836,341 | Fost | Nov. 20, 1906 |
| 1,437,005 | Newsom | Nov. 28, 1922 |
| 2,203,422 | Strobridge | Jan. 4, 1940 |

FOREIGN PATENTS

| Number | Country | Date |
|---|---|---|
| 477,279 | England | Dec. 20, 1937 |